United States Patent

Hayashi et al.

[11] Patent Number: 5,895,182
[45] Date of Patent: Apr. 20, 1999

[54] SPINDLE END PORTION CLEANING DEVICE FOR A MACHINE TOOL

[75] Inventors: Hideki Hayashi; Mamoru Akiyama, both of Shizuoka, Japan

[73] Assignee: Toshiba Kikai Kabushiki Kaisha, Japan

[21] Appl. No.: 08/900,813

[22] Filed: Jul. 25, 1997

[30] Foreign Application Priority Data

Jul. 26, 1996 [JP] Japan .................... 8-198032

[51] Int. Cl.⁶ ........................................ B23C 9/00
[52] U.S. Cl. ...................... 409/137; 408/56; 408/61; 408/241 R; 409/134
[58] Field of Search ................ 403/56, 61, 241 R; 134/169 R; 409/134, 135, 136, 137

[56] References Cited

U.S. PATENT DOCUMENTS

| 554,986 | 8/1896 | Kudo et al. | 409/137 |
| 4,822,218 | 4/1989 | Satoh | 409/136 |
| 5,332,343 | 7/1994 | Watanabe et al. | 408/56 |
| 5,356,245 | 10/1994 | Hosoi et al. | 408/56 |
| 5,487,629 | 1/1996 | Watanabe | 409/136 |

*Primary Examiner*—Daniel W. Howell
*Assistant Examiner*—Adesh Bhargava
*Attorney, Agent, or Firm*—Jones & Askew

[57] ABSTRACT

The device is equipped with a taper shank (23), a stationary member axially tapered shape (33), and a connecting member (49). The taper shank (23) is fitted in a deep portion of a shank receiving portion with a taper bore (5) formed at the tip portion of a spindle in such a manner that installation and removal are possible, and is fixedly connected to the spindle (3). The stationary member (33) is rotatably connected to the taper shank (23), and is located in the taper bore (5) with a clearance (35) and has a spray nozzle (37) for spraying cleaning fluid into the taper bore (5) and an inside passage (39). The connecting member (49) is connected, at one end thereof, to the stationary member (33) and is connected, at the other end thereof, to a supply block (13) located at the tip portion of a spindle head (1), and has a connecting passage (53) for continuously connecting a supply hole (15) and the spray nozzle (37).

4 Claims, 1 Drawing Sheet

SPINDLE END PORTION CLEANING DEVICE FOR A MACHINE TOOL

BACKGROUND OF THE INVENTION

1. Field of the Invention

The present invention relates to a spindle end portion cleaning device for a machine tool, and in particular, relates to a spindle end portion cleaning device for cleaning a inside surface of a shank receiving portion having a taper bore formed at a tip portion of a spindle and a spindle tip surface.

2. Description of the Related Art

In machine tools in the related art, the cleaning for removing contaminants or the like adhering on the inside surface of a shank receiving portion having a taper bore formed at a tip portion of a spindle, is performed by spraying air from a central bore of the spindle in which a tool installation and removal mechanism using a collet chuck or the like is placed and which axially communicates with the taper bore of the shank receiving portion.

In the above mentioned cleaning methods of the machine tools, contaminants adhering on the inside surface of a shank receiving portion having a taper bore are blown away by wind pressure in the state where the tool holder is removed from the shank receiving portion and the taper bore of the shank receiving portion becomes empty. However, since the cross sectional area of the taper bore of the shank receiving portion is large, it is difficult to get such a large wind velocity and a large wind pressure in the taper bore of the shank receiving portion, and accordingly, sure cleaning effects cannot be obtained.

Furthermore, in the above mentioned cleaning methods, the tip surface of the spindle cannot be sufficiently cleaned, and consequently, in case of using such a tool holder that a surface of a flange of the tool is closely joined to the tip surface of the spindle, the tip surface of the spindle may need to be cleaned by hand and automatic operation of the machine tool may be obstructed.

SUMMARY OF THE INVENTION

The present invention is made to solve the above mentioned problems, and a main object of the invention is to provide a spindle end portion cleaning device for a machine tool which can automatically and surely clean the inside surface of a shank receiving portion with a taper bore and the tip surface of a spindle, and further can be handled as a tool clamped and handled by automatic tooling changer.

To achieve the above object, according to a first aspect of the present invention, there is provided a spindle end portion cleaning device for a machine tool, comprising: a taper shank fixedly and detachably fitted in a deep portion of a shank receiving portion having a taper bore formed at a tip portion of the spindle; a stationary member rotatably connected to the taper shank around a center axis of the taper shank, the stationary member being axially tapered shape and being located in the taper bore with a clearance between the stationary member and the taper bore, the stationary member having a nozzle for ejecting cleaning fluid into the taper bore and having an inside passage connecting to the nozzle; and a connecting member connected to the stationary member at one end and connected to a supply block for supplying the cleaning fluid mounted on the machine tool at the other end thereof, the connecting member having a connecting passage for continuously connecting a supply hole formed in the supply block to the inside passage of the stationary member.

In the construction described above, the cleaning fluid is supplied from the supply hole of the supply block to the nozzle through the connecting passage of the connecting member and the inside passage of the stationary member, in a state where the taper shank is fitted in the deep portion of the shank receiving portion having the taper bore formed in the spindle and is fixedly connected to the spindle. Consequently, the cleaning fluid is ejected into the taper bore from the nozzle. The cleaning fluid flows through the clearance between the stationary member and the taper bore, and flows out to the outside from a front opening end of the taper bore, and while flowing through the clearance between the stationary member and the taper bore, the cleaning fluid increases velocity and pressure by effects of being contracted, and washes away sufficiently contaminants adhering on the inside surface of the taper bore.

Accordingly, cleaning of the inside surface of the taper bore of the shank receiving portion is performed automatically and surely.

The above mentioned spraying of the cleaning fluid can be performed in a state where the spindle rotates, and in this case, since the cleaning fluid is ejected from the nozzle of the stationary member relatively standing still to the rotation of the spindle, the velocity of the cleaning fluid is increased by the centrifugal force and the rotation accompanied with the spindle, and the cleaning fluid washes away contaminants adhering on the inside surface of the shank receiving portion.

Accordingly, the effects of the cleaning fluid for washing away contaminants adhering on the inside surface of the taper bore of the shank receiving portion, is increased, and cleaning of the inside surface of the taper bore is performed more surely.

According to a second aspect of the present invention, as it depends from the first aspect, the cleaning fluid supplied into the inside passage of the stationary member is liquid coolant used in cutting work by using the spindle and compressed air to be supplied after the supply of the liquid coolant.

In the construction described above, by spraying the compressed air in place of the liquid coolant after cleaning by using the liquid coolant as a cleaning fluid, the liquid coolant adhering on the inside surface of the taper bore can be blown away.

Furthermore, the liquid coolant here may be a specialized cleaning liquid other than the liquid coolant used in cutting work.

According to a third aspect of the present invention, as it depends from the first aspect, the stationary member further including: a straight portion projecting outward from the taper bore; and a hook member for being clamped by an automatic tooling changer rotatably attached to the straight portion, the hook member having a key portion formed to be connected to a key portion formed at a tip portion of the spindle, wherein one end surface of the hook member faces to a tip surface of the spindle with a predetermined clearance.

In the construction described above, since in the spindle end portion cleaning device for a machine tool, the hook member for being clamped by the automatic tooling changer is provided, the spindle end portion cleaning device can be handled as a tool handled by the automatic tooling changer, and installation and removal of the spindle end portion cleaning device can be performed similarly to the installation and removal of tools by the automatic tooling changer, and automatic operation of the machine tool is possible.

including both the cutting work and the cleaning of the spindle end portion. Since the hook member faces, at one end surface, to the tip surface of the spindle with a predetermined clearance, the cleaning fluid flowing out to the outside from the front opening end of the taper bore of the shank receiving portion, flows through the clearance, and cleaning of the tip surface of the spindle is also performed.

Accordingly, cleaning of the tip surface of the spindle can also be performed automatically and surely without requiring manual methods.

According to a fourth aspect of the present invention, as it depends from the third aspect, the connecting member further includes: a stopper for stopping the rotation of the hook member by being connected to the hook member; and a spring for urging the stopper so as to be connected with the hook member, wherein in a state where the taper shank and the stationary member are inserted into the taper bore, the key portion formed on the hook member is connected to the key portion formed at the tip portion of the spindle, the stopper moves in the direction of going away from the hook member against the spring force of the spring by contacting with the supply block, and the stopper breaks away from the connection with the hook member; and in a state where the taper shank and the stationary member are removed from the taper bore, the stopper breaks away from the contact with the supply block, the stopper moves in the direction of approaching the hook member by the spring force of the spring, and the stopper is connected to the hook member, thereby the rotation of the hook member is prevented.

In the construction described above, in the state where the taper shank and the stationary member of the spindle end portion cleaning device are inserted into the taper bore of the shank receiving portion, the stopper moves to the opposite side of the hook member against the spring force of the spring because of the contact with the supply block, and breaks away from the connection with the hook member, so that the rotation of the hook member key-connected to the spindle and the spindle is not prevented.

On the other hand, in the state where the taper shank and the stationary member are removed from the taper bore of the shank receiving portion, the stopper is connected to the hook member by the spring force of the spring, and prevents the rotation of the hook member. Consequently, it can be avoided for the relationship of the rotational position between the key-connecting position of the hook member and the position of the connecting member to fluctuate in the state where the taper shank and the stationary member are removed.

Accordingly, automatic installation and removal of the spindle end portion cleaning device can be performed smoothly and surely by the automatic tooling changer.

BRIEF DESCRIPTION OF THE ACCOMPANYING DRAWINGS

The above and further objects and novel features of the present invention will more fully appear from the following detailed description when the same is read in conjunction with the accompanying drawing, in which:

FIG. 1 is a vertical sectional view showing an embodiment of a spindle end portion cleaning device for a machine tool according to the present invention.

DETAILED DESCRIPTION OF THE PREFERRED EMBODIMENTS

Figure 1:
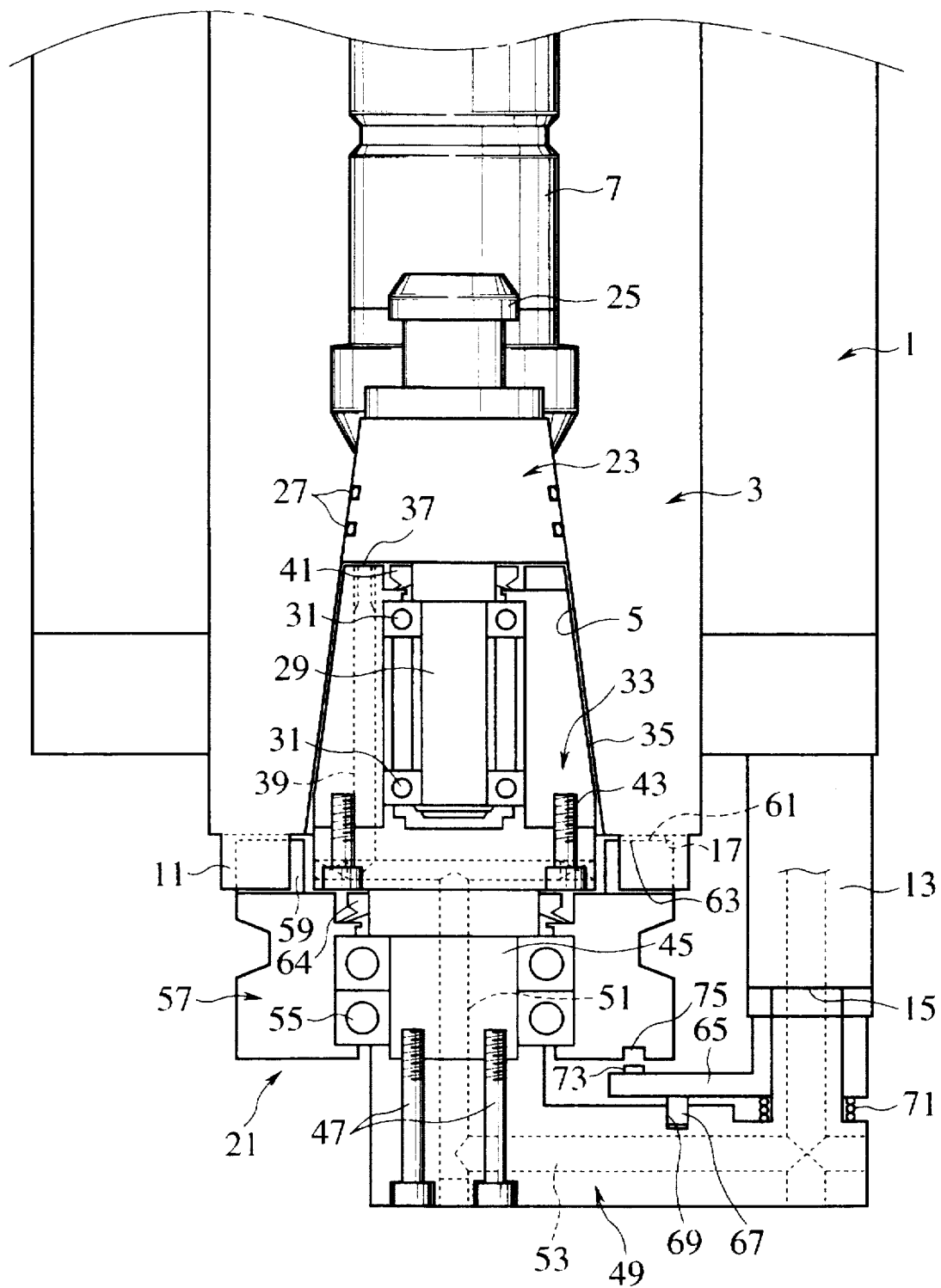

There will be detailed below the preferred embodiments of the present invention with reference to the accompanying drawing.

FIG. 1 shows an embodiment of a spindle end portion cleaning device for a machine tool according to the present invention. In the figure, numeral 1 indicates a spindle head. A spindle 3 is rotatably mounted to the spindle head 1. The spindle 3 has, similarly to conventional spindles, a shank receiving portion having a taper bore 5 formed at the tip portion of the spindle 3, and also has a spindle central bore 7 for containing a tool installation and removal mechanism (which is omitted in the figure) by using a collet chuck or the like. The taper bore 5 and the spindle central bore 7 axially communicate with each other. Moreover, a key connecting portion 11 as a key portion is formed at the tip portion of the spindle 3.

At the tip portion of the spindle head 1, a supply block 13 for supplying cleaning fluids is secured. At the tip surface of the supply block 13, a supply hole 15 is opened. From the supply hole 15, liquid coolant and compressed air as cleaning fluids are supplied.

The whole of spindle end portion cleaning device is indicated by numeral 21. The spindle end portion cleaning device 21 has a taper shank 23 fitted in the deep portion of the taper bore 5 in such a manner that installation and removal are possible. The taper shank 23 has a pull stud 25, and is fixedly connected to the spindle 3 with the pull stud 25 clamped by a tool installation and removal mechanism (which is not shown in the figure) in the spindle central bore 7, and rotates integrally with the spindle 3.

Moreover, to the taper shank 23, O rings 27 as a sealing member for preventing the liquid coolant from flowing to the side of the spindle central bore 7, are attached.

The taper shank 23 has a support axial portion 29 on the opening end side of the taper bore 5, and to the support axial portion 29, a stationary member which is axially tapered shape 33 is rotatably mounted through a ball bearing member 31.

The stationary member 33 is rotatably connected around the center axis of the taper shank 23, and is located in the taper bore 5 with a clearance 35 between the stationary member 33 and the taper bore 5, and has a spray nozzle 37 as a nozzle which is opened at the tip surface and ejects or sprays the liquid coolant, the air or the like into the taper bore 5 and has an inside passage 39.

Between the tip portion of the stationary member 33 and the support axial portion 29, a seal member 41 is attached for preventing the liquid coolant from flowing into the bearing portion of the stationary member 33. On the opening end side of the taper bore of the stationary member 33, a straight axial member 45 as a straight portion is fixedly connected with bolts 43. The straight axial member 45 is projecting forward from the taper bore 5, and to the projecting end, a connecting member 49 as a connecting member is fixedly mounted with bolts 47.

The connecting member 49 is shaped like a staple, and one end thereof is connected to the stationary member 33 through the straight axial member 45 and the other end thereof is connected to the tip portion of the supply block 13. In the connecting member 49, a connecting passage 53 is formed for continuously connecting with the supply hole 15 of the supply block 13 and with the inside passage 39 of the stationary member 33 through an inside passage 51 of the straight axial member 45.

To the straight axial member 45, a tool clamping member 57 as a hook member is rotatably attached for being clamped and handled by an automatic tooling changer (hereafter referred to as ATC) through a ball bearing member 55. The tool clamping member 57 is shaped like a ring, and is clamped by the ATC, and it is clamped when it is carried from a tool rack or a tool magazine to the spindle 3 and is mounted on the spindle 3. The tool clamping member 57 is connected to the key connecting portion 11 of the spindle 3 by using a key connecting portion 59 provided thereon, and faces to the spindle tip surface 17 at one end surface 61 with a predetermined clearance 63.

Between the straight axial member 45 and the tool clamping member 57, a seal member 64 is attached for preventing the liquid coolant from flowing into the bearing portion of the tool clamping member 57.

To the connecting member 49, a stopper 65 is mounted. The stopper 65 is rotationally stopped by the connection between a projecting portion 67 and a concave portion 69 of the connecting member 49, and is urged to the side to be connected to the tool clamping member 57 by a spring force of a spring 71, and in the state where the taper shank 23 and the stationary member 33 are removed from the taper bore 5, the stopper 65 is connected to a concave portion 75 of the tool clamping member 57 by using a projecting portion 73 and prevents the tool clamping member 57 from rotating.

Consequently, in the state where the taper shank 23 and the stationary member 33 are removed, fluctuations of the relationship of the rotational position between the key connecting position of the tool clamping member 57 and the position of the connecting member 49, can be avoided, so that if the tool clamping member 57 is key-connected to the spindle 3 as shown in the figure thereafter, the connection of the connecting member 49 with the supply block 13 is ensured with the key connecting portions 11 and 59.

As shown in the figure, in the state where the taper shank 23 and the stationary member 33 are inserted into the taper bore 5, the stopper 65 moves to the opposite side of the tool clamping member 57 against the spring force of the spring 71 by the contact with the supply block 13, and the projecting portion 73 slips off the concave portion 75, and the stopper 65 breaks away from the connection with the tool clamping member 57.

Consequently, the rotation of the tool clamping member 57 key-connected to the spindle 3 is not obstructed.

When cleaning the spindle end portion by using the spindle end portion cleaning device 21, the spindle end portion cleaning device 21 previously contained in a tool magazine, is automatically mounted on the spindle 3 by the ATC (which is not shown in the figure).

By the automatic mounting, the taper shank 23 of the spindle end portion cleaning device 21 is fitted into the deep portion of the taper bore 5 of the spindle 3, and the pull stud 25 is clamped by a tool installation and removal mechanism (which is not shown in the figure) in the spindle central bore 7, so that the taper shank 23 is fixedly connected to the spindle 3. Furthermore, the tool clamping member 57 is connected to the key connecting portion 11 of the spindle 3 by using the key connecting portion 59, and the connecting member 49 comes into contact with the supply block 13, and the supply hole 15 of the supply block 13 communicates with the spray nozzle 37 through the connecting passage 53 of the connecting member 49, the inside passage 51 of the straight axial member 45, and the inside passage 39 of the stationary member 33.

Furthermore, in the case, the stopper 65 moves to the opposite side of the tool clamping member 57 against the spring force of the spring 71, and the projecting portion 73 slips off the concave portion 75, and the stopper 49 breaks away from the connection with the tool clamping member 57.

In the above mentioned state, the spindle 3 is rotated at a specified rotational speed, and the liquid coolant is supplied from the supply hole 15 of the supply block 13 to the spray nozzle 37 through the connecting passage 53 and the inside passages 51 and 39.

Since the liquid coolant is supplied to the spray nozzle 37, the liquid coolant is ejected and sprayed into the taper bore 5 from the spray nozzle 37, and flows trough the clearance 35 between the stationary member 33 and the taper bore 5 to go to the front opening end of the taper bore 5, and further flows through the clearance 63 between the one end surface 61 of the tool clamping member 57 and the spindle tip surface 17 to flow out to the outside.

When flowing through the clearance 35 between the stationary member 33 and the taper bore 5, the liquid coolant increases velocity and pressure because of effects by being contracted (hereinafter referred to as contracting effects), and further, by being ejected and sprayed from the spray nozzle 37 of the stationary member 33 standing still relatively to the rotation of the spindle, the liquid coolant increases velocity because of the centrifugal force and the rotation accompanied with the spindle, and effectively washes away contaminants adhering on the inside surface of the taper bore 5.

Furthermore, when flowing through the clearance 63 between one end surface 61 of the tool clamping member 57 and the spindle tip surface 17, the liquid coolant increases velocity and pressure because of contracting effects, and further, by being sprayed from the spray nozzle 37 of the stationary member 33 standing still relatively to the rotation of the spindle, the liquid coolant increases velocity because of the centrifugal force and the rotation accompanied with the spindle, and effectively washes away contaminants adhering on the spindle tip surface 17.

Finally, by spraying the compressed air instead of the liquid coolant from the spray nozzle 37, the liquid coolant adhering on the inside surface of the taper bore 5 and the spindle tip surface 17, is blown away.

After the cleaning is finished, the spindle end portion cleaning device 21 is removed from the spindle 3 by the ATC, and the spindle end portion cleaning device 21 is returned to the tool magazine, and the cleaning process comes to an end.

Although the foregoing has described the present invention in detail with respect to specific embodiments, it will be appreciated by those skilled in the art that the present invention is not limited to the above embodiments, and various embodiments are possible in the range of the present invention.

Moreover, the liquid coolant herein may be a specialized cleaning liquid other than the liquid coolant used in cutting work as in another embodiment.

While preferred embodiments of the present invention have been described using specific terms, such description is for illustrative purposes, and it is to be understood that changes and variations may be made without departing from the spirit or scope of the following claims.

What is claimed is:

1. A spindle end portion cleaning device for a machine tool, comprising:

a taper shank fixedly and detachably fitted in a deep portion of a shank receiving portion having a taper bore formed at a tip portion of the spindle;

a stationary member rotatably connected to the taper shank around a center axis of the taper shank, the stationary member being axially tapered shape and being located in the taper bore with a clearance between the stationary member and the taper bore, the stationary member having a nozzle for ejecting cleaning fluid into the taper bore and having an inside passage connecting to the nozzle; and a connecting member connected to the stationary member at one end and connected to a supply block for supplying the cleaning fluid mounted on the machine tool at the other end thereof, the connecting member having a connecting passage for continuously connecting a supply hole formed in the supply block to the inside passage of the stationary member.

2. The spindle end portion cleaning device according to claim 1, wherein the cleaning fluid supplied into the inside passage of the stationary member is liquid coolant used in cutting work by using the spindle and compressed air to be supplied after the supply of the liquid coolant.

3. The spindle end portion cleaning device according to claim 1, wherein the stationary member further including:

a straight portion projecting outward from the taper bore; and a hook member for being clamped by an automatic tooling changer rotatably attached to the straight portion, the hook member having a key portion formed to be connected to a key portion formed at a tip portion of the spindle, wherein one end surface of the hook member faces to a tip surface of the spindle with a predetermined clearance.

4. The spindle end portion cleaning device according to claim 3, wherein the connecting member further including:

a stopper for stopping the rotation of the hook member by being connected to the hook member; and a spring for urging the stopper so as to be connected with the hook member, wherein in a state where the taper shank and the stationary member are inserted into the taper bore, the key portion formed on the hook member is connected to the key portion formed at the tip portion of the spindle, the stopper moves in the direction of going away from the hook member against the spring force of the spring by contacting with the supply block, and the stopper breaks away from the connection with the hook member; and in a state where the taper shank and the stationary member are removed from the taper bore, the stopper breaks away from the contact with the supply block, the stopper moves in the direction of approaching the hook member by the spring force of the spring, and the stopper is connected to the hook member, thereby the rotation of the hook member is prevented.

* * * * *